(12) United States Patent
Davis et al.

(10) Patent No.: US 7,113,913 B1
(45) Date of Patent: Sep. 26, 2006

(54) METHOD AND SYSTEM FOR PROVIDING INSURANCE PROTECTION AGAINST LOSS OF RETIREMENT ACCUMULATIONS IN A TAX FAVORED DEFINED CONTRIBUTION PLAN IN THE EVENT OF A PARTICIPANT'S DISABILITY

(75) Inventors: Philip T. Davis, New Fairfield, CT (US); Janet M. McCune, Plymouth, MN (US); Hubert V. Forcier, Minneapolis, MN (US)

(73) Assignee: Corporate Compensation Plans, Inc. of Connecticut, Danbury, CT (US)

( * ) Notice: Subject to any disclaimer, the term of this patent is extended or adjusted under 35 U.S.C. 154(b) by 0 days.

(21) Appl. No.: 09/328,856

(22) Filed: Jun. 9, 1999

Related U.S. Application Data

(60) Provisional application No. 60/088,969, filed on Jun. 10, 1998.

(51) Int. Cl.
  G06Q 40/00 (2006.01)
  G06Q 99/00 (2006.01)
(52) U.S. Cl. .............................................. 705/4; 705/1
(58) Field of Classification Search .................... 705/4, 705/36, 35, 1–2
  See application file for complete search history.

(56) References Cited

U.S. PATENT DOCUMENTS

| | | | | |
|---|---|---|---|---|
| 4,951,196 A | * | 8/1990 | Jackson | ........................ 705/37 |
| 5,806,047 A | * | 9/1998 | Hackel et al. | ................ 705/36 |
| 5,913,198 A | * | 6/1999 | Banks | ............................ 705/4 |
| 5,999,917 A | * | 12/1999 | Facciani et al. | .............. 705/36 |
| 6,085,174 A | * | 7/2000 | Edelman | ....................... 705/36 |
| 6,235,176 B1 | * | 5/2001 | Schoen et al. | ................. 705/4 |
| 6,604,080 B1 | * | 8/2003 | Kern | ............................. 705/4 |

OTHER PUBLICATIONS

Crosson, Cynthia. "Nest Egg Plans Raise Thorny Tax Issues," National Underwriter. Feb. 20, 1995. pp. 7, 15.*
Koco, Linda. "CIGNA LTD Add-On funds 401(k) During Disability," National Underwriter. Sep. 24, 1990. pp. 9-10*
Forcier, Hugh. "Small Business Act Provides Inadequate Solution for Long Term Disability Plans," Pension & Benefits Week Nov. 4, 1996. pp. 5-9.*
Davis, Philip T. "Gap in LTD Programs Can Disable Retirement," Best's Review. Nov. 1994. pp. 100-101.*
UNUM Long Term Disability Products. UNUM web page contents [http://www.unum.com/products/id/index.html] listed on Nov. 3, 1997. 7 pages.*
Blakeley, Stephen. "Insuring Your 401(k) Contributions," Nation's Business. Jul. 1998. p. 28.*

(Continued)

*Primary Examiner*—Sam Rimell
(74) *Attorney, Agent, or Firm*—Pillsbury Winthrop Shaw Pittman LLP

(57) ABSTRACT

A system and method for providing insurance protection against loss of contributions to tax favored defined contribution plans should an active employee/participant become disabled. The invention manages the administration of a disability insurance policy held inside the plan that continues contributions to the plan during a period of disability, where the coverage amount for each participant is determined by the level of contributions made by or for each participant.

34 Claims, 6 Drawing Sheets

OTHER PUBLICATIONS

"New Products Would Continue to Fund 401(k) Plans After Disability," Best's Review. May 1998. p. 66.*

"How to Determine the Case Level Benefit for the Integrated LTD/401(k) Product", pp. 5-22.

"401 (k) Completion—Making Contributions When They Can't", Union Central Insurance and Investments, Apr. 1998.

"Employee Security Benefit Trust", The Union Central Life Insurance Company, Jul. 1997.

"401 (k) Completion Feature—Initial Employer Coverage Information Under The Union Central Employee Security Benefit Trust", The Union Central Life Insurance Company, Sep. 1998.

* cited by examiner

Figure 4

TECHNICAL DESCRIPTION OF DCP PROCESSES (System fields appear in bold)

*I.     Annual determination of coverage dates and premiums*

For each participant:

If Coverage Election = YES

AndIf Date of Termination = 00/00/0000 or Date of Termination > Current Effective Date

Then

For each source of money:

If Source Eligible for Coverage = YES

AndIF participant had source contributions

Then

Coverage Date = Current Effective Date
                  and
               Source Coverage = Total prior year's source contributions (net of adjustments and corrections)
                  and
               Source Premium = Source Coverage x Insurance Rate
                  and
               Source Monthly Premium = Source Premium / 12
                  and
               Life-To-Date Source Coverage = Life-To-Date Source Coverage + Source Coverage

EndIF

EndIF

Next Source

EndIF

EndIF

Next Participant

Next participant

*IV.  Monthly disability payments*

For each participant:

If Disability Payment Start Date < Current Date

Then

For each source:

If Source Coverage = 0

Then

Purchase funds in amount of monthly payment, according to investment elections

EndIf

Next source

EndIf

Next Particiapnt

*V.  Year-End Archive*

For each plan:

Add 1 to Effective Date year

For each participant:

For each source, where T = current year

Source Coverage $^{T-1}$ = Source Coverage $^{T}$
        Source Premium $^{T-1}$ = Premium $^{T}$
        Source Coverage $^{T}$ = 0
        Source Premium $^{T}$ = 0

Next source

Next participant

Next plan

*II.    Annual fund transfer to cover premiums*

For each participant:

If Coverage Date = Current Effective Date

Then

For each source:

If Source Premium $\neq$ 0

Then

Sell eligible funds in amount of Source Premium
                    and
                    Buy "Disability Premium" Fund in amount of Source Premium

EndIf

Next Source

EndIF

Next participant

*III.    Monthly sale to pay premiums*

For each participant:

If Date of Termination = 00/00/0000 or Date of Termination >= 1ˢᵗ day of current month Then For each source:

If Source Monthly Premium $\neq$ 0

Then

Sell "Disability Premium" fund in amount of Source Monthly Premium

EndIf

Next source

EndIf

METHOD AND SYSTEM FOR PROVIDING
INSURANCE PROTECTION AGAINST LOSS
OF RETIREMENT ACCUMULATIONS IN A
TAX FAVORED DEFINED CONTRIBUTION
PLAN IN THE EVENT OF A PARTICIPANT'S
DISABILITY

This application claims the benefit of Provisional Patent Application Ser. No. 60/088,969 filed Jun. 10, 1998.

BACKGROUND OF THE INVENTION

1. Field of the Invention

The present invention relates generally to the field of employee benefits, and more specifically to systems and methods for insuring against loss of retirement benefits. Yet more particularly, the invention relates to and is applied to retirement plans established under United States Tax Law, and under Title 26 of the United States Internal Revenue Code.

2. Description of the Related Art

Employee benefits are generally divided into welfare benefits (such as health care, disability and life insurance), qualified retirement benefits (may take the form of defined executive wealth accumulation programs).

Under a defined benefit plan, the plan document sets forth a formula for determining the amount of monthly retirement income to be paid to an employee after he/she reaches normal retirement (or some earlier retirement age). This formula is based on the employee's length of service or a combination of the employee's length of service and pay (either career pay or final average pay). The benefit is provided from a trust or annuity contract to which usually only the employer contributes. The amount of contributions necessary to provide the promised benefits for the covered work force is determined under minimum standards set out in federal law and the actual annual contribution amount is determined by the employer with the assistance of an actuary. Each employee's benefit is insured by a federal agency (called the "Pension Benefit Guaranty Corporation" or "PBGC") and because of the minimum funding standards and the PBGC insurance, benefits to the employee are not solely dependent on the accumulations in the trust on behalf of the employee.

Defined contribution plans are retirement programs where the employee's final retirement benefit is determined solely by the value of an "account" that has been established within the plan for the benefit of the employee. Contributions to that account and investment gains or losses of the account during the employee's working career, are paid to the employee at normal retirement age (or some earlier age) as specified in the plan document. As is evident, the amount of the employee's retirement benefit is directly, and entirely, related to the accumulations in the employee's account. The PBGC does not insure defined contribution plans. Employers make contributions to defined contribution plans using some non-discriminatory formula, such as a percentage of each employee's compensation as defined by the plan. In addition, if the plan has a 401(k) feature (26 United States Code 401(k)), employers may make contributions to the plan based on an employee's election to defer a portion of his/her cash compensation into the plan (such contributions are called "employee deferrals.") Plans with 401(k) features often allow for special employer contributions called "employer matching contributions" whereby the employer will make an additional contribution to the employee's account based on the amount of deferral the employee elects.

(References to code sections herein, such as 401(k), 401(m), 410(b), 415(c), etc. shall be understood to refer to sections of the United States Internal Revenue Code, United States Code, Title 26.)

All qualified retirement plans are required to adhere to strict tax laws and regulations set forth in the Employee Retirement Income Security Act of 1974 (ERISA), the Internal Revenue Code of 1986 as amended (IRC), various Revenue Rulings and Procedures, and Department of Labor regulations. The general standards of accuracy and completeness are unusually high. The IRS demands that plans comply both "in form" and "in operation" with the tax "qualification requirements." Compliance "in form" means that the plan document language must comply with all applicable tax laws and regulations (as interpreted by the IRS). Compliance "in operation" means that the plan must be administered in strict adherence to its written provisions-even provisions that have been adopted solely for design reasons (and would not have needed to have been adopted to achieve "qualified" status). Both form defects and operational defects may result in the IRS "disqualifying" the plan or imposing a "correction program" on the plan. Either result would have enormous financial implications for the employer sponsoring the defective plan; therefore, employers are extremely careful to see that their plans comply with all regulations in regard to both features and practices.

Loss of Current Income

The Loss of income during a period of long-term disability has generally been addressed under an employer's welfare benefits through a long-term disability plan. The employer may choose to fund this plan through the use of a group long-term disability contract, individual insurance contracts, a self-insurance arrangement, or a combination of the above. This plan partially replaces the loss of regular earnings that would otherwise be paid during the employee's period of disability. Benefits under these disability programs typically stop at the individual's "ADEA cut-off age." For a person who becomes disabled prior to the attainment of age 60, the ADEA cut-off age is usually age 65. For workers who become disabled after attaining age 60, the ADEA cut-off age is usually five years after the commencement of disability payments. This plan typically does not address the needs of disabled employees after retirement age. At retirement, a disabled employee's disability benefit will cease and income must be provided by a combination of Social Security benefits, qualified retirement plan benefits, and personal savings.

Loss of Retirement Benefits

Employees who have been covered by a defined benefit plan for most of their working career may have a portion of their retirement income needs met by their qualified retirement plan benefits, even if they suffer a long-term disability during their career. Defined benefit plans may provide that if a participant becomes disabled, service, and if applicable, pay, would be deemed to continue for purposes of determining the amount of the retirement benefit provided under the plan's formula. Some plans also commence paying benefits at the time of disability and continue paying benefits throughout retirement.

In contrast, under the typical defined contribution plan, if a participant becomes disabled and remains disabled beyond a period of "short-term disability" (during which the employee is usually compensated through the regular payroll), contributions to the employee's account under the plan will cease. Therefore, an active employee is at risk that if he/she should become disabled and contributions to the plan are not made, the value of his/her plan account at the commencement of retirement will be substantially less than it would be if he/she had not become disabled. The reduction in the value of the employee's account will produce a direct loss of retirement income to the employee. If the plan allows benefits to be paid at disability, the available benefits are based on the accumulations in the account to date, and immediate payment of benefits from the account increase the likelihood that the account will be depleted before retirement age, further exaggerating the problem. Since the introduction of 401(k) plans, many employers have entirely, or significantly, shifted the focus of their retirement benefits from defined benefit plans to defined contribution plans, often with a 401(k) feature, making this disability risk a reality for millions of employees.

The potential loss of retirement account values at age 65 (usually considered to be the "normal retirement age") assuming disability occurs at certain ages that last for certain periods of time can be illustrated as follows:

Qualifying the Exposure

The diminution in inflation adjusted retirement income for every $1000 of annual employer pre-tax or employer matching contribution:

| If disability occurs at age: | And continues to age: | | | |
|---|---|---|---|---|
| | 35 | 45 | 55 | 65 |
| 25 | $52,500 | $88,071 | $112,071 | $128,357 |
| 35 | | $35,357 | $59,357 | $75,642 |
| 45 | | | $24,000 | $39,428 |
| 55 | | | | $16,071 |

The chart expresses the individual's loss in inflation adjusted income attributable to the assumed $1000 of annual contribution that would have been made had the disablement not occurred.

Assumptions:

1. 4% real rate of return (that is, inflation adjusted)
2. Plan withdrawals over 15 years starting at age 65
3. No salary scale. (That is, it was assumed that this individual's compensation would not have increased during the period he/she was disabled.

In the foregoing chart, it was assumed that the individual's compensation would have remained the same during the period of disability. However, if it is assumed that the individual's compensation would have increased by a certain percentage (e.g. a commonly used "salary scale" such as 5% per year), the losses would be proportionately greater.

"Outside the Plan" Arrangements

Until the introduction of the invention, employers did not think it was possible to address this risk inside the 401(k) and other retirement plans by including disability insurance as a feature of the plan. Even though retirement plans may include "incidental health and welfare" benefits, there was no known way to structure the insurance without complicating the "non-discrimination" requirements that apply to all "benefits, rights or features" for plans subject to IRS Section 410(b) testing. Therefore, some employers have attempted to deal with this risk on the part of their employees by using various funding arrangements outside of the retirement plan. Each outside the plan arrangement presents significant problems.

Arrangement One—Increase the Group LTD Benefits

Some employers have increased the benefits payable under their group long-term disability (LTD) contract, or their long-term disability program, to cover the potential loss. For example, an employee who elects a 6% deferral and receives a 4% match to the 401(k) plan, might receive an additional 10% of pay benefit under the regular, or a supplemental, group LTD policy. There are three main problems with this approach.

Problem One—The insurance may not be "linked" to employee deferrals. Tax policy requires that no other benefits may be contingent upon an employee's deferral election under a 401(k) plan. If the employer links the amount of coverage under a group LTD policy directly or indirectly to the level of employee deferrals and/or employer matching contributions under a 401(k) plan, contributions to the plan will cease to be viewed as "elective deferral contributions" under the federal tax laws. And, since highly compensated employees and non-highly compensated employees elect deferrals at differing percentages of compensation, without the special tests applicable to deferrals, these contributions would not be able to pass the non-discrimination requirements. Alternatively, for the employer to set an arbitrary amount of insurance based on average contributions would result in some employees having their account funded more heavily if they become disabled, and other employees having their account under-funded in the event of disability.

Problem Two—The employee may be "over-insured." Actuaries at most insurance companies are of the view that increasing the cash benefit payable during a disability will have an adverse impact on the rate at which some disabled individuals respond to rehabilitation. This is especially true if the benefit is provided on a tax-free basis, which is the design under many employers' group LTD programs. This risk of over-insurance would require a substantial, disproportionately large increase in the risk charge that must be imposed as part of the premium for the group LTD policy. Similarly, this over-insurance could create a substantial increase in benefit payments in a self-insured LTD program.

Problem Three—The employee may not save the benefit for retirement. If the employee spends the additional benefit before his/her retirement years, the employer's objective will not have been achieved and the employee still has a significant risk of loss at retirement.

Arrangement Two—Continue Employer Contributions to the Plan

Some employers have attempted to deal with the employee's loss of contributions during a long-term disability by continuing to make contributions to the plan on behalf of the employee during the period of disability equal to the pre-disability level of contributions. There are three main problems with this approach.

Problem One—Difficulty with IRC Section 415(c). Certain tests are prescribed under IRC Section 415(c) that determine the maximum annual additions allowed to the plan in a plan year. This generally limits contributions to a defined contribution plan to 25% of the employee's taxable compensation paid by the employer. Since a disabled individual is receiving no compensation directly from the employer, the contribution limit becomes zero (25% multiplied by $0 compensation). A special provision of the tax laws permits the limit to be applied by assuming that a disabled employee's compensation continues during a period of disability at the same level that it was prior to the commencement of disability. However, the rule applies only if the participant is disabled under a very restrictive "any occupation" definition of disability. If an employer wishes to use a less restrictive "own occupation" definition of disability for the first two to five years following the commencement of disability (as most employers would desire), the special rule provides no relief for the tests prescribed under IRC Section 415.

Problem Two—Difficulty with Non-Discrimination Tests. Contributions that are made by the employer on behalf of disabled employees who are "highly compensated employees" ("HCE" as defined by tax laws) may have difficulty passing non-discrimination tests. Contributions that are made by employers on behalf of disabled employees under this approach may not be tested as matching contributions under 401(m) after the first 12 months. IRC Section 401(k) and 401(m) describe the parameters for allowing higher levels of deferrals and matching contributions to be made (on the average) by, or for, HCEs than are made (on the average) by, or for, non-HCEs. Since HCEs almost always make larger percentage of pay contributions than non-HCEs, if the employer continues the same level of contributions that it was making for the disabled individual prior to the disability and these tests no longer apply, the contributions would almost certainly be considered discriminatory.

Problem Three—The Benefit is Not Insured. An employer who decides to continue contributions during a long-term disability could also have a change of heart. The employer could choose to unilaterally cut back the continuing contribution—even with respect to persons who are already disabled. And the disabled individual is at risk that the employer will go bankrupt. Even if the employer has insured its risk, the benefits payable after bankruptcy would be retained by the estate of the bankrupt employer and would benefit all of the employer's general creditors (including the employees) on a pro-rata basis.

Arrangement Three—Continue Employee Contributions from LTD Benefits

Some employers permit a disabled employee to make contributions to the 401(k) plan out of the benefit he/she is receiving from the group LTD plan. There are three main problems with this approach.

Problem One—The LTD Benefit Must Be Taxable to the Employee. This approach avoids the IRC Section 415 and non-discrimination problems noted as Problem One and Two above only if the group LTD benefit is taxable to the employee. A number of employers have structured their group LTD benefit in such a way that the benefit under the group LTD policy is (or, at the election of the employee, can be) tax free. Employees would be giving up a significant tax advantage and a significant amount of disability income in order to be able to contribute a portion of the benefit to the 401(k) plan.

Problem Two—The 401(k) Plan and LTD Plan Must Cover Non-HCEs Equally. This approach is likely to avoid a discrimination problem with regard to availability only if most of the non-HCEs participating in the 401(k) plan are also participants in an LTD program that provides the same (or higher) percent of pay benefits than are provided to most of the HCEs. The minimum coverage standards of ERISA applicable to the 401(k) plan require coverage for many employees who work part-time (i.e. at least 1000 hours per year). These ERISA standards do not apply to the group LTD program and many employers do not provide LTD coverage to part-time employees. If a sufficient proportion of non-HCEs who are participants in the 401(k) plan are not participants in the LTD program, the availability of disability coverage under the 401(k) plan may not pass non-discrimination tests.

Problem Three—An HCEs Loss Cannot be Fully Covered. Because of the application of the 401(k) and 401(m) non-discrimination tests with regard to average contributions for HCEs and non-HCEs, an HCE may not be able to replace his/her entire pre-disability contribution. For example, consider an HCE who was contributing 6% of pay to the 401(k) plan, becomes disabled, and receives a 60% of pay LTD benefit. In order to continue his/her old contribution amount, he/she would need to contribute 10% of the LTD benefit. Such an increase in the deferral percentage for disabled HCEs would no doubt increase the average percentage for the HCE group and may result in failure of the 401(k) and/or (m) tests.

SUMMARY OF THE INVENTION

The method and system of the present invention are adapted to overcome the above-noted shortcomings and to fulfill the stated needs. The essence of one aspect of the invention is a method for making substitute continuing periodic payments into an investment account normally paid from a specific source, during a period of nonpayment from the specific source, wherein the nonpayment is due to a particular condition. This method comprises the steps of: purchasing, with funds of an investment account an insurance policy to make, upon occurrence of a particular condition causing a period of nonpayment to the investment account, substitute payments to the investment account in amounts approximately equal to those paid from a specific source before the period of nonpayment; and, paying, upon occurrence of the particular condition, benefits under the insurance policy into the investment account. This inventive method is applied effectively to retirement accounts, and especially to defined contribution plan accounts, to prevent loss of accumulations during an employee's disability.

The inventive system serves similar purposes, and comprises the following elements: an insurance policy adapted to make, upon occurrence of a particular condition causing a period of noncontribution to a potentially-eligible employee's retirement plan account, substitute contributions to the plan account in amounts approximately equal to those made by the potentially-eligible employee and/or by the potentially eligible employee's employer before a period of noncontribution; means for collecting and storing potentially-eligible employee indicative data; means for determining an employee's potential eligibility to be a member of a group insured under the insurance policy; means for calculating periodic premiums for each potentially-eligible employee for appropriate coverage under the insurance policy; means for accounting premiums paid for the insurance policy; means for accounting benefits paid under said insurance policy; and, means for deducting calculated premium amounts from plan assets.

Invention Effectively Replaces Lost Contributions

The effectiveness of the invention in replacing lost contributions can be illustrated by examining the account values of four equally contributing plan participants at four different ages (35, 45, 55, 65). For each of the four individuals, final account value will be determined by one of these four situations:

1. He/she does not have the invention and does not become disabled;
2. He/she has the invention and does not become disabled;
3. He/she does not have the invention and becomes disabled;
4. He/she has the invention and becomes disabled.

For sake of simplicity, it will be assumed that disability for participants in situation c) and d) occurs at the beginning of the year in which they achieve age 40. It will also be assumed that all four participants are contributing $4500 per year to the plan and that all began contributing at the beginning of the year in which they achieve age 35. All participants make 24 payroll deposits to the plan each year and earn a 9% annual investment return. The premium for the insurance is $45 per year per participant and it is paid out of each participant's annual contributions beginning at age 36. Insurance benefits for the participant in situation d) are paid to the plan monthly after a 365 elimination period. Premium is waived at the point in which benefit payments begin.

| | Never Disabled | | Disabled at Age 40 | |
|---|---|---|---|---|
| Age | Not Insured | Insured | Not Insured | Insured |
| 35 | $4,699.51 | $4,699.51 | $4,699.51 | $4,699.51 |
| 45 | $82,524.70 | $81,779.49 | $47,168.75 | $82,079.59 |
| 50 | $266,756.24 | $264,255.84 | $111,665.58 | $265,572.31 |
| 65 | $702,929.61 | $696,243.73 | $264,353.03 | $699,966.33 |

The financial loss to the individuals who become disabled is significant and the effect of the invention in mitigating this loss is apparent.

Invention Solves the "Anti-Linking" Problem

Tax law states that no other employee benefit program may have benefits based on the employee's deferral election under the 401(k) plan. To do so would disqualify the "elective" nature of these contributions. By structuring the insurance as a feature of the plan, the amount of insurance coverage available to each insured may be exactly equal to his/her level of elective contributions in the 401(k) plan. This allows each person's exact loss to be insured, and it is consistent with the nature of a 401(k) plan that allows each employee to invest according to his/her individual retirement goals.

Invention Solves the "Over Insurance" Problem

By paying disability benefits to the plan for the benefit of the disabled employee, the concern of "over-insurance" is mitigated. Because the benefit is not paid as cash to the disabled employee, there will not be a significant impact on the employee's motivation toward rehabilitation. The insurer may require that the plan propose additional withdrawal restrictions on plan assets that are the result of disability benefits, such as excluding these assets from hardship withdrawals and loans, or restricting distribution of these assets during the period of disability. Further, the insurance contract could specify that disability benefits will cease if insurance proceeds are withdrawn from the plan.

Invention Solves the "Saved for Retirement" Problem

The safeguards that may apply to the over-insurance problem as described above will also solve another problem presented by the "outside the plan" arrangements. Under an arrangement where the disabled employee has control of the disability benefits, there is a risk that the benefits may not be saved for retirement as intended. By depositing the benefits to the plan and implementing the restrictions described above, the employer is assured that the benefits will be treated as plan assets, with even more stringent restrictions during the period of disability.

Invention Solves the IRC Section 415(c) Problem

IRC Section 415(c) limits the maximum "annual additions" to most retirement plans for an individual to 25% of covered compensation. Ordinarily, since the disabled employee's covered compensation is zero, any contribution to the plan would be in excess of these limits. The invention solves this problem by treating the insurance as an investment of the plan so that benefits paid to the plan may be considered investment returns rather than contributions. Investment returns are not included as "annual additions" under 415(c).

Invention Solves the IRC Section 401(k) and 401(m) Testing Problems

Both of the problems discussed earlier with regard to continuing contributions into the 401(k) plan for disabled HCEs are the result of testing those contributions under the 401(k) and (m) rules that describe the parameters for contributions on behalf of HCEs. Once again, the invention avoids this problem by treating the insurance as an investment of the plan so that benefits paid to the plan may be considered investment returns rather than contributions. If benefits paid on behalf of a disabled HCE are investment returns rather than contributions, they are not subject to the non-discrimination requirements or the tests prescribed in IRC Section 401(k)/(m).

In addition, the invention provides a way to establish that the coverage amount is non-discriminatory because it is linked to contributions that must be demonstrated as non-discriminatory under 401(k)/(m). In addition, contributions made by the employer or employee to pay the premium would be included in these tests as described below.

Invention Solves the Complications to the Regular LTD Plan

Under the invention, the retirement plan disability insurance is provided by a free standing insurance contract that does not complicate the regular group LTD plan. The employer is free to structure the regular LTD program to exclude part-time employees (even if they are included in the retirement plan) and provide a tax-free benefit (if desired by the employer and/or employee) without regard to the retirement plan. However, since the retirement plan disability insurance is also provided by a group LTD contract, experience under this contract may influence experience ratings under the regular LTD contract. This result is unlikely since the elimination period under this contract is probably longer than the elimination period under the regular LTD contract.

Invention Solves the "Benefit Guarantee" Problem

Under the invention, the insurance benefits are provided through the purchase of a contract from an insurance company, and therefore, are secured by the financial backing of the insurer. Continuation of benefits is set by the terms of the contract, not upon the employer's financial solvency or good will.

Invention Facilitates Compliance Testing

The following tests must be applied to determine that the insurance offered within the plan meets the non-discrimination requirements of a retirement plan.

1. IRC Section 415(c) Testing. If the premium for the insurance is being paid from contributions, whether from a special "premium designated" employer contribution or from the regular contributions, the premium for insurance coverage for the current policy year is included in the prior plan year's "annual additions" of IRC Section 415(c). The 25% of covered compensation maximum would include any premiums paid for the following year. As discussed earlier, disability benefits deposited to the trust are not included as annual additions.

2. IRC Section 401(k) and (m) Testing. If the premium for the insurance is being paid from contributions, whether from a special "premium designated" employer contribution or from the regular contributions, the premiums for coverage in force the current policy year are included in the prior plan year's contributions under any applicable non-discrimination tests of IRC Section 401(k) and (m). If a special "premium designated" employer contribution is allocated differently the regular employer matching contribution or if there is no regular employer matching contribution, the premium contribution would need to be tested separately under IRC Section 401(m) for the prior plan year. This is probable because the premium contribution would most likely be made for employees still employed on the last day of the prior plan year and most regular matching contributions are made for all employees who elect deferrals during the year.

3. IRC Section 410(b) Testing. The "current availability" portion of the benefits, rights, and features test applicable to the disability insurance coverage as a benefit of the plan is passed by applying the 410(b) classification test to the group of participants for whom coverage entitlement is earned in the prior plan year. The classification test is applied without average benefit testing, although the lower threshold set forth in the average benefit test may be used for the classification test. In addition, the benefits, rights and features test applicable to an employer "premium contribution" (whether matching or non-matching,) should the employer choose to make such a contribution is passed by applying the same 410(b) classification test to those receiving the contribution for the prior plan year.

The amount of insurance coverage provided to eligible employees is demonstrated to be non-discriminatory because it is linked to contributions which are already demonstrated to be non-discriminatory by the 401(k) and (m) tests.

4. Incidental Benefit Limit. The incidental benefit test limiting premium for "incidental health and welfare benefits" to 25% of the employee's annual contribution is applied assuming that the entire premium contribution is deemed as being made at the end of the prior plan year, even if the contribution is accrued for the prior plan year and deposited to the trust the following plan year. This is important for employers making a special premium contribution for the prior plan year at the beginning of the current policy year, even though the employer may choose to deposit the balance of the contribution to the trust at a later time, as allowed by tax laws. Premium for the disability insurance is commingled with applicable premium for life insurance held by the plan.

Invention Can be Applied to Other Defined Contribution Plans

Defined contribution plans that include non-401(k) employee deferrals or employee contributions, such as government sponsored deferred compensation arrangements under IRC Section 457 or plans sponsored by churches under IRC Section 403(b)(9) may also use the invention to insure contributions in the event of a participant's disability.

Defined contribution plans under IRC Section 401(a) that include employer contributions based on a percentage of compensation for each eligible participant rather than on the election of the participant (such as profit sharing or money purchase pension contributions) may also employ the methodology.

Thus, it is an object of the present invention to provide a method and system for preventing loss of contributions to a retirement plan during an employee's disability.

It is a further object of the present invention to provide a method and system for insuring against loss of retirement benefits during disability, without violating tax law restrictions against linking other benefit programs to an employee's deferral election.

Yet another object of this invention is to provide insurance against loss of retirement contributions during disability which does not result in a significant impact on an employee's motivation toward rehabilitation.

Yet a further object of the present invention is to provide insurance against loss of retirement contributions during disability through a vehicle which minimizes risk that the benefits may not be saved for retirement, as intended.

Still a further object of the present invention is to provide means for insuring against loss of retirement benefits during disability, wherein benefits paid to the plan may be considered investment returns, rather than contributions, thus complying with maximum annual addition limitations under IRC Section 415(c).

Another object of the present invention is to provide insurance against loss of retirement contributions during disability which is not subject to the non-discrimination requirements or the tests prescribed in IRC Section 401(k)/(m).

And it is also an object of the present invention to provide a method and system for insuring against loss of retirement benefits during disability which does not complicate an employer's regular group LTD plan.

Still further objects of the inventive system and method disclosed herein will be apparent from the drawing figures and following detailed description thereof.

BRIEF DESCRIPTION OF THE DRAWINGS

FIG. 4 is a step-wise textual flow chart setting forth the same procedure as is illustrated by FIG. 3.

DESCRIPTION OF THE PREFERRED EMBODIMENT

Figure 1:
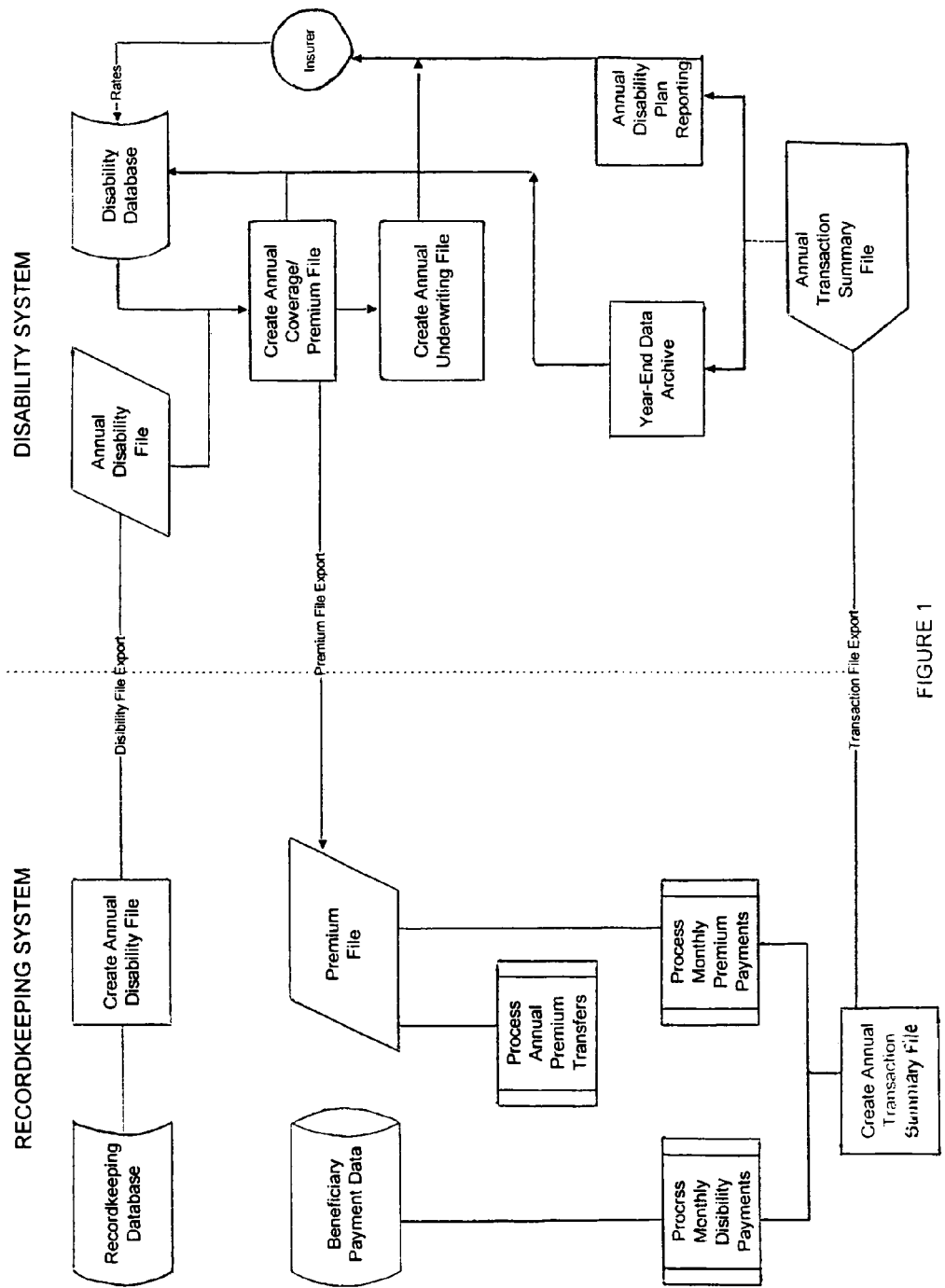
FIG. 1 is a procedural flow chart illustrating how the record keeping software and disability application work together to share information.

The invention includes: 1) the identification of two basic principles that solve the problems inherent in any of the other arrangements, and 2) a methodology for applying these two principles to the administration of the retirement plan.

Principle 1: Insurance is Included as a Provision of the Retirement Plan

Disability insurance covering plan contributions must be included as a plan feature in the retirement plan document and the conditions for receiving disability coverage must be set forth in both the plan document and the Summary Plan Description (SPD). Because it is a feature of the plan, the policy is held by the plan as an investment of the trust, plan assets are used to pay premiums, and benefits payable under the policy are paid to the plan rather than the disabled individual Principle 2: Insurance for the Current Year Depends on the Prior Plan Year If the insurance policy is a "feature" of the retirement plan as described under the first principle, it becomes subject to all of the compliance requirements of the plan. Therefore, IRS Section 410(b) that describes non-discrimination for all "benefits, rights, and features" of the plan would apply. Conservative practice dictates that the insurance must be non-discriminatory with regard to availability and with regard to the amount of coverage. The invention provides a way to define the insurance availability and coverage amount in a manner that may be demonstrated as non-discriminatory under Section 410(b). Without this conclusive testing being applied before the payment of premium, or worse yet, the payment of benefits, the insurance could be found to be discriminatory in operation, with serious consequences to the plan.

The second principle of the invention is that the insurance is a feature of the retirement plan for the plan year before the policy year for which the coverage is in force. In other words, the entitlement to the coverage is earned by participants in the retirement plan the prior year and the plan feature providing the disability insurance coverage applies to the prior plan year, but the actual insurance is in force for disabilities occurring the next policy year. The results of this prior plan year/current policy year relationship are:
1. The amount of coverage for the current policy year is equal to insured plan contributions for the prior plan year.
2. The eligible group for the current policy year is determined by plan participation in the prior plan year.
3. Premiums for the current policy year are paid from the prior plan year's contributions and/or earnings.
4. The insurance is tested under the tax rules for non-discrimination in the prior plan year.

This allows the amount of insurance coverage for each participant to be related both to a fixed compensation amount (to satisfy insurance company underwriting requirements and plan administration procedures) and to contributions (to satisfy non-discrimination rules).

EXAMPLE

An employer who has a 401(k) plan with a calendar plan year amends the plan on Nov. 30, 1998 to include disability insurance covering employee deferrals and the employer matching contributions for 1998. In addition, the employer chooses to make a special matching contribution to the plan to pay the premium. Therefore, the insureds are employees who had employee deferrals and employer matching contributions made to the 401(k) plan on their behalf for the 1998 plan year. The amount of coverage is equal to the amount of employee deferral and employer matching contributions for 1998 (excluding the special "premium" match), and the premium contribution is deposited to the plan as a 1998 contribution. The insurance is tested for non-discrimination with regard to the "benefits, rights, and features" test for 1998, and the special matching contribution is tested under IRC Section 401 for 1998. The effective date of the insurance would be Jan. 1, 1999 and the policy would provide insurance for disabilities occurring in 1999.

Alternative Embodiments of the Invention

Several existing software, whether manufactured by a software company or created by the user for the purpose of record keeping a Defined Contribution Plan, track assets in the trust on a participant by participant level and store the data required under applicable tax laws. All assets in the trust are accounted for via a matrix that tracks "sources," or types of money, that are deposited into the trust (i.e. employee pre-tax deferral contributions, employer matching contributions, employer profit sharing contributions, rollover contributions, etc.) and "funds," or investment options, within the trust (securities or investments in which trust assets are invested). Contributions, investment earnings, fees, loans, withdrawals, and other account activity are identified =>with both the correct source and fund within each participant's account.

The preferred embodiment of the invention would be a separate computerized software program, or "disability application," to collect the required data from the record keeping system to calculate premiums for each eligible participant and create the transaction instruction for the record keeping system to initiate the payment of the premium from each participant's account. The disability application provides current coverage and premium data for both the record keeping system and the insurer and archives historical participation data in the disability policy for use by the insurer to monitor coverage in force and adjudicate future disability claims. The disability application also provides data on the disability policy for the record keeping system to include in preparing the necessary compliance tests for the plan.

Another satisfactory method of applying the invention is to incorporate the processes and calculations of the methodology within the record keeping software itself and avoid the need for interface between the two systems. In either approach, the computerized processes covered by the invention remain the same.

Insurance Contract Provisions

Applying the methodology to the underlying group long-term disability insurance policy requires certain unique provisions in the insurance contract. The insurance contract must contain the following provisions:
1. The policyholder is the trustee of the insured plan.
2. The policy year of the insurance contract is matched to the plan year of the plan (i.e. January 1–December 31, etc).
3. The insured for the policy year are employees who had an insured contribution made to the plan on their behalf for the prior plan year.

4. The amount of monthly benefit for each insured is equal to ¹/₁₂th of the amount of insured contributions for the prior plan year.
5. The premium for the current year is paid by the trustee from the prior year's contributions or investment earnings.
6. The elimination period between the occurrence of the disability and the commencement of benefits is at least 365 days.
7. The policy provides for benefits to be paid to the plan in the event of an insured's long-term disability.
8. Disability benefits will cease if they are withdrawn from the plan during the disability period.

Methodology of the Invention

The following functions, processes, and calculations are necessary to apply the basic principles of the invention to plan administration processes.

I. Underwriting/Renewal Process
   Process 1 —Collect "employee indicative data" from record keeping system the appropriate participant-level data fields required by the insurer to provide initial or renewal premium rates:
   Participant/record identifier (i.e. SSN)
   Gender
   Occupation Code
   Date of Birth
   Date of Hire
   YTD compensation (W-2 pay from plan entry date, [ok if capped at $160,000])
   YTD contributions (by source for insured sources only)
   This information is provided annually based on the YTD information for the current plan year for the insurer to provide rates for the following policy year. If the YTD data to be provided includes less than six plan months of data, the current year information will not be sufficient. In those cases, the complete annual information from the plan year prior to the year in which the file is being prepared will be used.
   Process 2—Prepare file with renewal data and send to the insurer.

II. Annual Eligibility Determination
   Process 1 —Collect data from record keeping system necessary to identify employee participants meeting the definition of eligibility for the new policy year under the insurance contract and to determine coverage in force based on the prior plan year's insured contributions, then assign or maintain the existing Effective Date of insurance for each.
   Requirements to be in Eligibility Group:
   1. Contribution made for an Insured Source in the Plan Year prior to the Policy Year; and,
   2. No Date of Termination prior to the last day of the prior Plan Year.
   Process 2 —Calculate annual and monthly premium for each eligible participant for appropriate coverage in force using the rate provided by the insurer and send file with annual amount back to record keeping system.
   Process 3 —Expand record keeping matrix to include "Beneficiary Payments" as a source of money and "Insurance Premium Fund" as an investment fund offered by the Plan.
   Process 4 —Transfer assets from the other funds to the Insurance Premium Fund in the amount necessary to pay the full year's premium on the first day of the new policy year for all eligible participants. Assets to pay the premium may be taken from any of the prior year's contribution sources (employee deferral, employer match, etc.), from the prior year's investment earnings, or a combination of both. As an alternative, the employer may make a special contribution to the plan to cover the premium. This contribution would be deposited directed to the Insurance Premium Fund as a new money source for the prior year.

III. Monthly Premium Transactions
   Process 1 —At each premium due date, collect updated participant information (specifically date of termination and beneficiary payment status) from the record keeping system to determine eligible participants for whom premiums are due. Premiums are paid for all identified in the annual Eligibility Group, except those with a Date of Termination on or before the last day of the prior month, and those who received a Disability Benefit from this policy in the prior month.
   Process 2 —Prepare a transaction file for the record keeping system to deduct appropriate premium amounts from participant accounts and instruct the trustee to forward payment to the insurer.
   Process 3 —Produce a report for the insurer of total covered lives, total insurance in force, and total premiums for the premium due date.

IV. Retroactive Premium Adjustments
   Process 1 —If at any time during the policy year the amount of contributions for the prior plan year are adjusted due to errors in accounting, or adjustments are required to pass compliance tests (i.e., recharacterization of contributions, refunds of contributions, employer corrective contributions are made for the plan year), the corrected contribution amounts are collected from the record keeping system and sent to the disability system and a corrected coverage in force is determined for affected participants.
   Process 2 —Recalculate the annual premium amount for the entire policy year using the corrected coverage in force. If premiums to date have been overpaid for affected individuals, the overpayment is credited against future premiums due for the individual. If premiums to date have been underpaid for affected individuals, the underpayment is included in future premiums due for the individual. If the participant has already terminated, no adjustment is made.

V. Beneficiary Payment Deposits
   Process 1 —Deposit beneficiary payments received by the trust from the insurer to the Beneficiary Payment source of money in the record keeping matrix for the disabled participant and flag such payments as withdrawal restricted while benefits are being paid to the trust on behalf of the disabled participant.
   Process 2 —Identify and notify the insurer of any disabled participant taking a withdrawal of beneficiary payments made to the plan while in beneficiary payment status.

VI. Annual Reporting/Archiving
   Process 1 —Prepare a report for each employee participant of the amount of coverage in force and the amount of premium paid during the current policy year.
   Process 2 —Produce reports for the insurer of total covered lives, total insurance in force, and total premiums paid for the policy year.
   Process 3 —Archive the annual participation data, including specific participants for the policy year, effective dates of coverage, amount of coverage in force, and total premiums paid by participant and maintain policy records for inspection by the insurer for a period of seven years.

Process 4 —Verify effective date, premiums paid, and coverage in force for the insurer in the event of a disability claim made by an insured.

VII. Annual Compliance Testing/Reporting

Process 1 —Provide data to include premiums paid from contributions for coverage in force the current policy year in applicable testing for the prior plan year under 415(c). Adjust contributions and premiums as necessary to pass tests. Exclude amounts deposited during the prior plan year as beneficiary payments.

Process 2 —Provide data to include premiums paid from contributions for coverage in force the current policy year under applicable testing for 401(k) and/or (m) for the prior plan year. If the employer made a matching premium contribution for the prior plan year for the exact group of participant's receiving the regular matching contribution, include the matching premium contribution in the applicable 401(k) and/or (m) tests. Exclude amounts deposited during the prior plan year as beneficiary payments.

Process 3 —If the employer made a matching premium contribution for the prior plan year and the regular matching contribution does not have a last day of plan year requirement, the application must provide data for a special 401(k) and/or (m) test on the matching premium contribution for the prior plan year.

Process 4—Provide data for a 410(b) classification test using the lower threshold of the average benefit test on the group of participants who earned entitlement to the insurance in the prior plan year (generally will include all participants contributing during the year and who were still employed on the last day of the plan year).

Process 5 —Provide data for a 410(b) classification test if any employer premium contribution was made for the prior plan year, using only those who received the contribution for the prior plan year (may include all participants still employed on the last day of the plan year or may include only participants contributing during the year and still employed on the last day of the plan year)

Process 6 —Provide data for the incidental benefit test limiting insurance premiums to 25% of annual contributions using total annual premium for each individual (must combine with any applicable life insurance premiums paid by the plan).

Process 7 —Provide data required for preparation of tax reporting forms 1099 or W-2 in the case that premiums paid for the insurance are taxable, or that beneficiary payments withdrawn from the plan by the employee participant are taxable.

Data Sources

The disability application will receive data from:
1. An automatic import from the record keeping system.
2. Manual file load from employer's HRIS records.
3. Manual input of insurance rates from insurer, disability payment status, disability payment amount, etc.

Database Elements

The disability application will require new database elements within the record keeping system at the System Level, the Plan Level, and the Participant Level.

System Level Information
Disability premium transaction code
Disability benefit payment transaction code
Plan Level Information
Additional fund—Disability Premiums
Additional source of money—Disability Benefits
Source flag for all sources—Contribution Eligible for Disability Insurance
Flag for Disability Source—Exclude Source from Compliance testing
Annual Effective Date
Current Effective Date
Disability Premium Rate
Coverage Percentage—percent of Eligible Contribution to be insured
Voluntary—Y or N whether Disability Insurance is elective
Premium Source Flag—which Source Premiums are paid from
Participant Level Information
(* Indicates data elements already held within record keeping system. All other data elements are new.)
*Social Security Number
*Name
*Address
*City State Zip
*Date of Birth
*Date of Hire/Rehire
*Date of Termination
Sex
Occupation Code
Election to Participate Flag
Coverage Effective Date
Disability Date
Disability Payment Start Date
Disability Benefit Status
Annual Coverage Amounts (by Source)
Annual Premium Amounts (by Source)
Life-to-Date Coverage Amounts (By Source)

Note: Year-To-Date and Life-To-Date premium and payment information should be accessible via transaction detail reporting within the record keeping system.

Menu Structure

The menu structure will require items on both the record keeping side and the disability application side. They are as follows:

Record Keeping System Menu Elements
1. Export Annual Disability File
2. Import Premium File
3. Process Annual Premium Transfers
4. Process Monthly Premiums
5. Process Monthly Disability Payments Disability Application Menu Elements
1. Import Annual Disability File
2. Calculate Annual Coverage/Premiums
3. Export Premium File
4. Year-End Archive
5. Reporting Flowcharts and Diagrams FIG. 1—Disability Compensation Plan Procedural Flowchart This figure details how the record keeping software and disability application work together to share information.

The participant level data necessary for processing the insurance initially resides within the record keeping system. The disability application would provide the necessary administration functions and send the transaction information back to the record keeping system. This figure illustrates the functions provided by the disability software, which include calculation of the premium amounts, creating transaction records for the record keeping system, and providing data archive.

Figure 2:
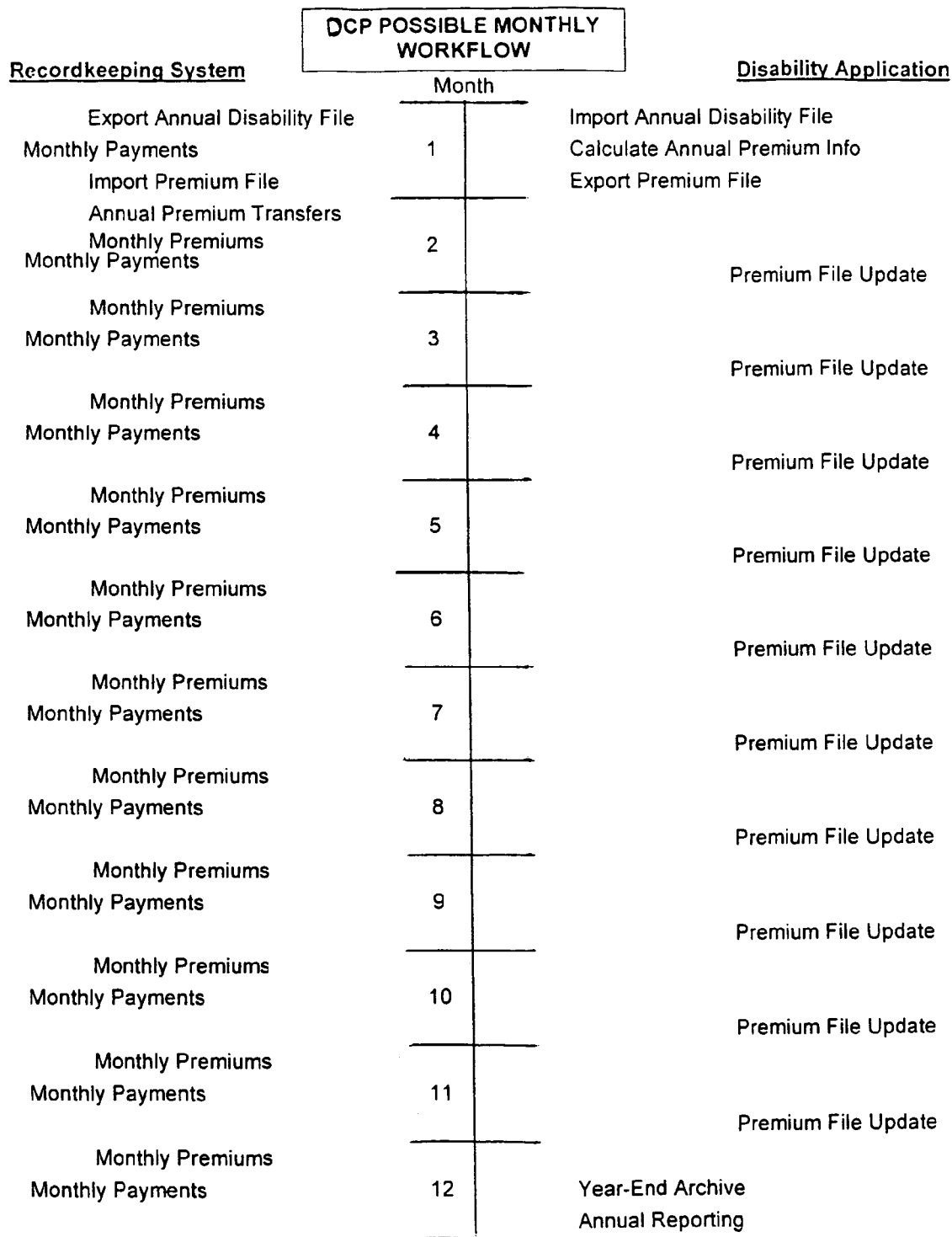
FIG. 2 is a flow chart showing the timing of the data exchange between the record keeping system and the disability software.

FIG. 2—Disability Compensation Plan Possible Monthly Workflow

This figure illustrates the timing of the data exchange between the record keeping system and the disability software in order to administer the insurance.

Figure 3:
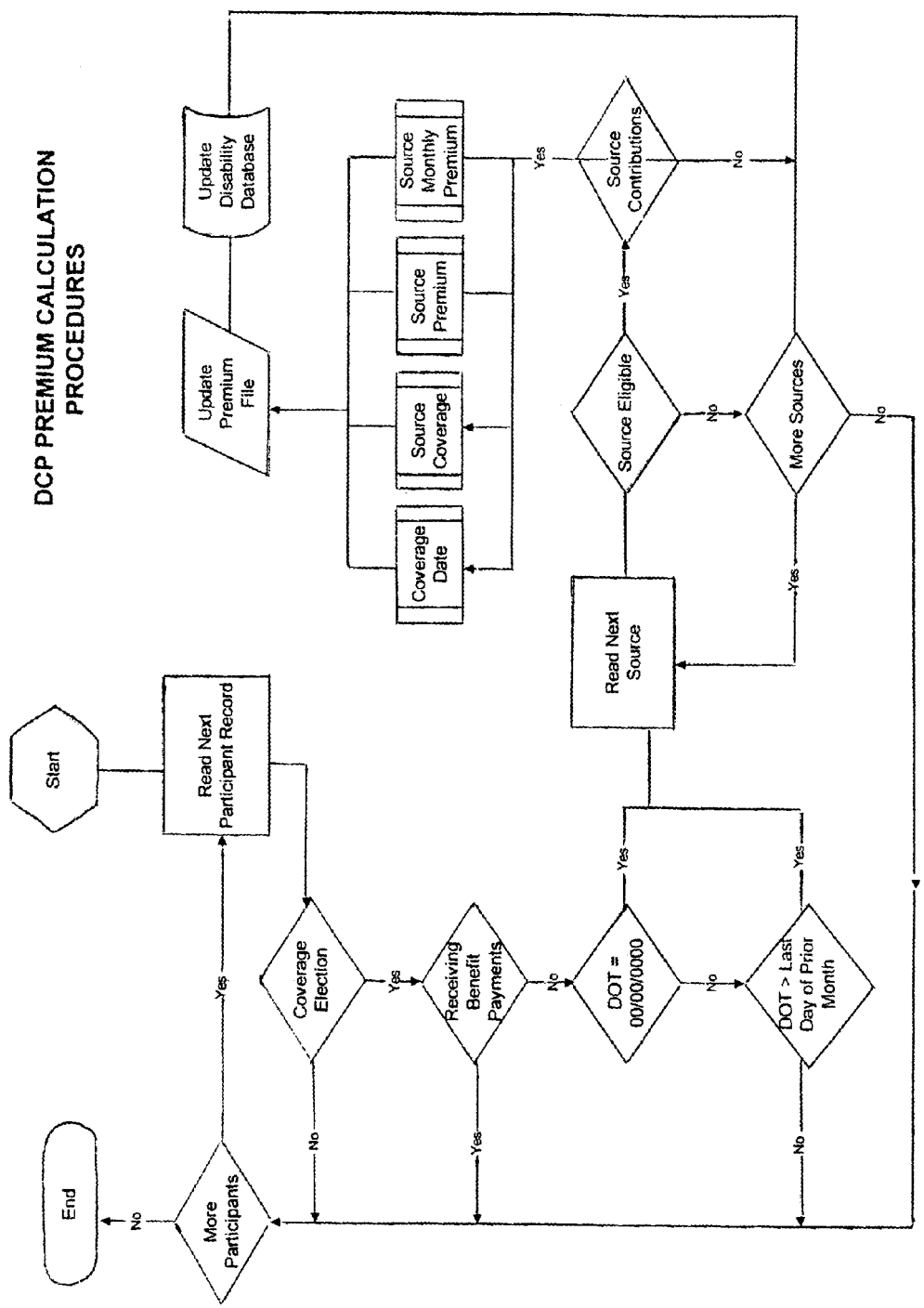
FIG. 3 is a flow chart showing the logical steps carried out by the disability application to determine eligibility, to calculate premiums and to export the transaction information to the record keeping system.

FIG. 3—Disability Compensation Plan Premium Calculation Procedures

FIG. 3 illustrates the logical procedures the disability application undertakes in order to determine eligibility for insurance, calculate the premiums and return the transaction information to the record keeping system.

FIG. 4—Technical Description of Disability Compensation Plan Processes

FIG. 4 illustrates the same procedure for determining eligibility, calculating premiums as FIG. 3 but in the form of text.

Variations of the Methodology

Premiums Paid As Plan Expense

Defined Contribution Plans are allowed under regulations provided by the IRS and the Department of Labor (DOL) to pay certain plan expenses from plan assets. Plan expenses must be related directly to the administration of the plan itself. Generally, such expenses are netted out of investment earnings and are not itemized on the participant statements. Plan expenses in total are included on the annual reporting Form 5500 and are given to participants in the Summary Annual Report.

If approved by the IRS and the DOL, disability insurance as an inherent feature of the plan could be charged against earnings as a plan expense. The principles of holding the insurance inside the plan and using the prior plan year as the basis for coverage in the insurance would remain unchanged. This variation in the methodology would be as follows:

First—the file described under "Process I, Underwriting/Renewals Process" would be prepared for the insurer. Additional data required by the insurer would include the employer's current and projected turnover ratio. The insurer would calculate the premium rate and establish the total annual premium for the plan by projecting total plan year contributions, terminations through the remainder of the year and terminations for the next year, and possible adjustments due to discrimination tests, etc. The annual premium for the plan is fixed, but the number of individuals and total amount of coverage may change during the plan year due to terminations, testing, etc.

Second—before the end of the prior plan year, the trustee instructs the record keeper to allocate the total annual premium as an "expense" against earnings for the prior plan year. Record keeping software allows the user to build in system parameters on how the expense should be allocated. For this expense, the parameters would be set to allocate the expense only to participants who are not terminated, who are not receiving disability benefits, and who are under age 65; then the allocation would be weighted according to contributions. The total premium would be subtracted from the plan's final quarter earnings and moved into a segregated account. The total annual premium would be sent to the insurer after the effective date of coverage. This step would replace processes II through IV.

Third—beneficiary payments for a participant receiving a disability benefit would be handled exactly as "Process V—Beneficiary Payment Deposits."

Fourth—"Process VI—Annual Reporting/Archiving" would not be necessary. If a disability claim is made by a participant, the insurer would check with the employer to see that the eligibility requirements under the terms of the policy have been met and to verify the actual amount of coverage that was in force for the individual on the date of disability.

Fifth—Steps 4, 6, and 7 would be the only required processes under "Process VII—Annual Compliance Testing/Reporting."

Individual Disability Policies

The methodology described herein uses a group long-term disability policy to provide the insurance. However, if the insurance is to be offered on a voluntary basis, a group policy may not be desirable and the methodology may be better applied using individual policies for the participants in the plan who desire the coverage. Once again, the principles of holding the insurance inside the plan and using the prior plan year as the basis for coverage for the insurance would remain unchanged. The premium for individual policies would be paid annually for the entire plan year and coverage would continue throughout the plan year, even if an employee terminates employment. The modifications to the methodology are as follows:

First—the underwriting and annual eligibility would be as described in Processes I and II.

Second—rather than monthly premium transactions as explained in Process III, the system would track a "yes" or "no" election for each participant and would pay the annual premium once at the beginning of the year for each participant electing "yes" (illustration included in FIG. 3). In addition, the system would send the entire participant record to the insurer, who would keep participant specific data for each policy.

Third—Processes IV, V, VI, and VII would be as described.

Application to Other Defined Contribution Plans

Other Employee Deferrals

Defined contribution plans that include non-401(k) employee deferrals or employee contributions, such as government sponsored deferred compensation arrangements under IRC Section 457 or plans sponsored by churches under IRC Section 403(b)(9) may also use the invention to insure contributions in the event of a participant's disability. Such plans are not subject to all of the tax regulations and non-discrimination requirements that a 401(k) plan must meet, however, the invention allows for these plans to provide insurance in a manner consistent with plan administration requirements and insurance underwriting requirements, while assuring that insurance proceeds will be held until retirement.

Defined contribution plans sponsored by educational or charitable organizations under IRC Section 403(b)(7) are restricted to investing in annuities or mutual funds. Should the rules regarding investment options for these plans be broadened, the invention would also be useful to such plans, since they are also subject to the non-discrimination requirements of IRC Section 415(c) and/or the Maximum Exclusion Allowance and IRC Section 401(m) (for matching contributions).

Other Employer Contributions

Defined contribution plans under IRC Section 401(a) that include employer contributions based on a percentage of compensation for each eligible participant rather than on the election of the participant (such as profit sharing or money purchase pension contributions) may also employ the methodology. Because these employer contributions are not subject to the anti-linking rules or 401(k)/(m) non-discrimination testing (unless elected by the employer), not all of the presented arguments for the necessity of the invention apply to these types of contributions. However, employers often provide employees a defined contribution program that involves a combination of both 401(k) employee deferrals and employer contributions, and generally, all contribution types are administered together as one retirement program. Therefore, the presented methodology is the only consistent way to offer disability insurance covering all contribution types. To employ another methodology to the non-401(k) or non-matching contributions would be overly confusing to the employees.

In addition, it would be undesirable for the amount of insurance coverage and the premium to change as a participant's compensation changes during the plan year under any type of defined contribution plan. Because in any qualified defined contribution plan the insurance amount must be based on a non-discriminatory formula, such as contributions (which must be demonstrated to be non-discriminatory under plan rules), using the prior year as the basis for coverage produces the best result. Such plans also have the option of applying the methodology using a fixed percentage of the prior year's plan compensation for each participant as the basis for determining insurance amount rather than using the prior year's actual contributions. All other aspects of the methodology would apply as described.

The foregoing detailed disclosure of the inventive method and system are considered as only illustrative of the preferred embodiment of, and not a limitation upon the scope of, the invention. Those skilled in the art will envision many other possible variations of the structure disclosed herein that nevertheless fall within the scope of the following claims.

And, alternative uses for this inventive method and system may later be realized. Accordingly, the scope of the invention should be determined with reference to the appended claims, and not by the examples which have herein been given.

The invention claimed is:

1. A method for making substitute continuing payments into a trust of a retirement plan, into which contribution payments are normally made on behalf of an employee participating in the plan, during a period of non-payment due to a long-term disability of the employee, comprising:
   a. including a disability insurance policy as a feature of the plan;
   b. holding the insurance policy as an asset of the plan's trust;
   c. providing a computer processing system for performing the steps of:
      (i) receiving information relating to said employee's pre-disability contribution amount; and
      (ii) calculating, based on said information, a premium amount for the insurance policy and a disability benefit amount under the insurance policy, said disability benefit amount being substantially equal to the pre-disability contribution amount;
   d. paying the premium amount calculated by the computer system with assets of the trust; and
   e. receiving the disability benefit amount calculated by the computer system into the plan's trust.

2. The method of claim 1, wherein the retirement plan is a tax qualified defined contribution 401(a) plan, thereby subjecting said insurance policy to the terms of said defined contribution plan, including rules and regulations of the Internal Revenue Service (IRS) and the Department of Labor (DOL) to which the defined contribution plan itself is subject.

3. The method of claim 1, wherein the retirement plan is a tax qualified 401(k) plan, thereby subjecting said insurance policy to the terms of said 401(k) plan, including the IRS and DOL rules and regulations to which the 401(k) plan itself is subject.

4. The method of claim 1, wherein said disability benefits payable under the insurance policy are received into the trust as investment return of the trust.

5. The method of claim 1, wherein, in accordance with provisions of the IRC and its attendant rules and regulations, the plan is subject to non-discrimination requirements with regard to eligibility for the insurance, and performing the step of matching eligibility for said insurance to eligibility for the plan, performing the step of matching eligibility for the insurance to participation in the plan, or both.

6. The method of claim 1, wherein, in accordance with the provisions of the IRC and its attendant rules and regulations, the plan is subject to non-discrimination requirements with regard to premiums for the insurance and benefits under the insurance, and performing the step of linking said premiums and benefits to pre-disability contributions to the plan, said pre-disability contributions having been demonstrated to meet the plan's non-discrimination requirements by definition or by testing.

7. The method of claim 6, wherein said premiums and benefits are linked to contributions to the plan that, in accordance with the IRC and its attendant rules and regulations, are based on a non-discriminatory formula.

8. The method of claim 6, wherein said premiums and benefits are linked to contributions to the plan that are equal to a fixed percentage of compensation for all participants in the plan.

9. The method of claim 1, wherein the trust includes an individual account allocated to each participating employee and the insurance premium for each said employee is paid from said employee's account.

10. The method of claim 1, wherein the trust includes an individual account allocated to each participating employee, the computer processing system further calculates a total annual premium for all participating employees, and step (d) includes paying said total annual premium on an overall-plan basis from the trust as a plan expense.

11. The method of claim 10, wherein said total annual premium is paid from a specific account, source, or fund held in the trust.

12. The method of claim 10, wherein said total annual premium is paid from the earnings of the trust prior to the earnings being allocated to said individual participant accounts.

13. A method for making substitute continuing payments into a trust of a retirement plan, into which contribution payments are normally made on behalf of an employee participating in the plan, during a period of non-payment due to a long-term disability of the employee, comprising:
  a. including a disability insurance policy as a feature of the plan;
  b. holding the insurance policy as an asset of the plan's trust;
  c. providing a computer processing system for performing the steps of:
    (i) receiving information relating to said employee's pre-disability contribution amount; and
    (ii) calculating, based on said information, a premium amount for the insurance policy and a disability benefit amount under the insurance policy, said disability benefit amount being substantially equal to the pre-disability contribution amount;
  d. paying the premium amount calculated by the computer system with assets of the trust; and
  e. receiving the disability benefit amount calculated by the computer system into the plan's trust,
  wherein, in accordance with provisions of the IRC and its attendant rules and regulations, the plan is subject to non-discrimination requirements with regard to eligibility for the insurance, and performing the step of matching eligibility for said insurance to eligibility for the plan, performing the step of matching eligibility for said insurance to participation in the plan, or both for the plan year prior to the policy year for which the insurance is effective.

14. A method for making substitute continuing payments into a trust of a retirement plan, into which contribution payments are normally made on behalf of an employee participating in the plan, during a period of non-payment due to a long-term disability of the employee, comprising:
  a. including a disability insurance policy as a feature of the plan;
  b. holding the insurance policy as an asset of the plan's trust;
  c. providing a computer processing system for performing the steps of:
    (i) receiving information relating to said employee's pre-disability contribution amount; and
    (ii) calculating, based on said information, a premium amount for the insurance policy and a disability benefit amount under the insurance policy, said disability benefit amount being substantially equal to the pre-disability contribution amount;
  d. paying the premium amount calculated by the computer system with assets of the trust; and
  e. receiving the disability benefit amount calculated by the computer system into the plan's trust,
  wherein, in accordance with the provisions of the IRC and its attendant rules and regulations, the plan is subject to non-discrimination requirements with regard to premiums for the insurance and benefits under the insurance, and performing the step of linking said premiums and benefits to the contributions to the plan for the plan year prior to the policy year for which the insurance is effective, said contributions having been demonstrated to meet the plan's non-discrimination requirements by definition or by testing.

15. A method for making substitute continuing payments into a trust of a defined contribution 457 plan, into which contribution payments are normally made on behalf of an employee participating in the plan, during a period of non-payment due to a long-term disability of the employee, comprising:
  a. including a disability insurance policy as a feature of the 457 plan;
  b. holding the insurance policy as an asset of the plan's trust;
  c. providing a computer processing system for performing the steps of:
    (i) receiving information relating to said employee's pre-disability contribution amount; and
    (ii) calculating, based on said information, a premium amount for the insurance policy and a disability benefit amount under the insurance policy, said disability benefit amount being substantially equal to the pre-disability contribution amount;
  d. paying the premium amount calculated by the computer system with assets of the trust; and
  e. receiving the disability benefit amount calculated by the computer system into the plan's trust,
  wherein said insurance policy is subject to the terms of said 457 plan, including the IRS and DOL rules and regulations to which the 457 plan itself is subject.

16. A method for making substitute continuing payments into a trust of a defined contribution 403(b) plan, into which contribution payments are normally made on behalf of an employee participating in the plan, during a period of non-payment due to a long-term disability of the employee, comprising:
  a. including a disability insurance policy as a feature of the 403(b) plan;
  b. holding the insurance policy as an asset of the plan's trust;
  c. providing a computer processing system for performing the steps of:
    (i) receiving information relating to said employee's pre-disability contribution amount; and
    (ii) calculating, based on said information, a premium amount for the insurance policy and a disability benefit amount under the insurance policy, said disability benefit amount being substantially equal to the pre-disability contribution amount;
  d. paying the premium amount calculated by the computer system with assets of the trust; and
  e. receiving the disability benefit amount calculated by the computer system into the plan's trust,
  wherein said insurance policy is subject to the terms of said 403(b) plan, including the IRS and DOL rules and regulations to which the 403(b) plan itself is subject.

17. A method for making substitute continuing payments into a trust of a retirement plan, into which contribution payments are normally made on behalf of a participant of the plan, during a period of non-payment due to a long-term disability of the plan participant, the method comprising:
  a. including a disability insurance policy as a feature of the plan;
  b. holding the insurance policy as an asset of the plan's trust;
  c. providing a computer processing system for performing the steps of:
    (i) receiving information relating to said participant's pre-disability contribution amount; and
    (ii) calculating, based on said information, a premium amount for the insurance policy and a disability benefit amount under the insurance policy, said disability benefit amount being substantially equal to the pre-disability contribution amount;
  d. paying the premium amount calculated by the computer system with assets of the trust; and e. receiving the disability benefit amount calculated by the computer system into the plan's trust, wherein the plan is subject to non-discrimination requirements with regard to eligibility for the insurance, and performing the step of matching eligibility for the insurance to eligibility for the plan, performing the step of matching eligibility for the insurance to participation in the plan, or both, for the plan year prior to the policy year for which the insurance is effective.

18. The method of claim 17, wherein the retirement plan is a tax qualified defined contribution 401(a) plan, thereby subjecting said insurance policy to the terms of said defined contribution plan, including rules and regulations of the Internal Revenue Service (IRS) and the Department of Labor (DOL) to which the defined contribution plan itself is subject.

19. The method of claim 17, wherein the retirement plan is a tax qualified 401(k) plan, thereby subjecting said insurance policy to the terms of said 401(k) plan, including the IRS and DOL rules and regulations to which the 401(k) plan itself is subject.

20. The method of claim 17, wherein said disability benefits are received into the trust as investment return of the trust.

21. The method of claim 17, wherein the trust includes an individual account allocated to each participant and the insurance premium for each said participant is paid from said participant's account.

22. The method of claim 17, wherein the computer processing system further calculates a total annual premium for all plan participants, and step (d) includes paying said total annual premium on an overall-plan basis from the trust as a plan expense.

23. The method of claim 22, wherein the trust includes an individual account allocated to each participant and said total annual premium is paid from the earnings of the trust prior to the earnings being allocated to said individual participant accounts.

24. The method of claim 17, wherein the retirement plan is either a 403(b) plan or a 457 plan.

25. A method for making substitute continuing payments into a trust of a retirement plan, into which contribution payments are normally made on behalf of a participant of the plan, during a period of non-payment due to a long-term disability of the plan participant, the method comprising:
   a. including a disability insurance policy as a feature of the plan;
   b. holding the insurance policy as an asset of the plan's trust;
   c. providing a computer processing system for performing the steps of:
      (i) receiving information relating to said participant's pre-disability contribution amount; and
      (ii) calculating, based on said information, a premium amount for the insurance policy and a disability benefit amount under the insurance policy, said disability benefit amount being substantially equal to the pre-disability contribution amount;
   d. paying the premium amount calculated by the computer system with assets of the trust; and
   e. receiving the disability benefit amount calculated by the computer system into the plan's trust, wherein the plan is subject to non-discrimination requirements with regard to premiums for the insurance and benefits under the insurance, and performing the step of linking said premiums and benefits to pre-disability contributions to the plan for the plan year prior to the policy year for which the insurance is effective, said pre-disability contributions having been demonstrated to meet the plan's non-discrimination requirements by definition or by testing.

26. The method of claim 25, wherein the retirement plan is a tax qualified defined contribution 401(a) plan, thereby subjecting said insurance policy to the terms of said defined contribution plan, including rules and regulations of the Internal Revenue Service (IRS) and the Department of Labor (DOL) to which the defined contribution plan itself is subject.

27. The method of claim 25, wherein the retirement plan is a tax qualified 401(k) plan, thereby subjecting said insurance policy to the terms of said 401(k) plan, including the IRS and DOL rules and regulations to which the 401(k) plan itself is subject.

28. The method of claim 25, wherein said disability benefits are received into the trust as investment return of the trust.

29. The method of claim 25, wherein the trust includes an individual account allocated to each participant and the insurance premium for each said participant is paid from said participant's account.

30. The method of claim 25, wherein the computer processing system further calculates a total annual premium for all plan participants, and step (d) includes paying said total annual premium on an overall-plan basis from the trust as a plan expense.

31. The method of claim 30, wherein the trust includes an individual account allocated to each participant and said total annual premium is paid from the earnings of the trust prior to the earnings being allocated to said individual participant accounts.

32. The method of claim 25, wherein the retirement plan is either a 403(b) plan or a 457 plan.

33. The method of claim 25, wherein said premiums and benefits are linked to contributions to the plan that, in accordance with the IRC and its attendant rules and regulations, are based on a non-discriminatory formula.

34. The method of claim 25, wherein said premiums and benefits are linked to contributions to the plan that are equal to a fixed percentage of compensation for all participants in the plan.

* * * * *